Oct. 18, 1966 A. L. TOWLES 3,279,584
ARTICULATED CASCADE CONVEYOR SYSTEM AND APPARATUS
Filed Jan. 20, 1964 8 Sheets-Sheet 1

INVENTOR
Arthur L. Towles

BY John L. Shortley
ATTORNEY

Oct. 18, 1966    A. L. TOWLES    3,279,584
ARTICULATED CASCADE CONVEYOR SYSTEM AND APPARATUS
Filed Jan. 20, 1964    8 Sheets-Sheet 2

INVENTOR
Arthur L. Towles

BY John L. Shartley
ATTORNEY

Oct. 18, 1966  A. L. TOWLES  3,279,584
ARTICULATED CASCADE CONVEYOR SYSTEM AND APPARATUS
Filed Jan. 20, 1964  8 Sheets-Sheet 2

INVENTOR
Arthur L. Towles
BY John L. Shortley
ATTORNEY

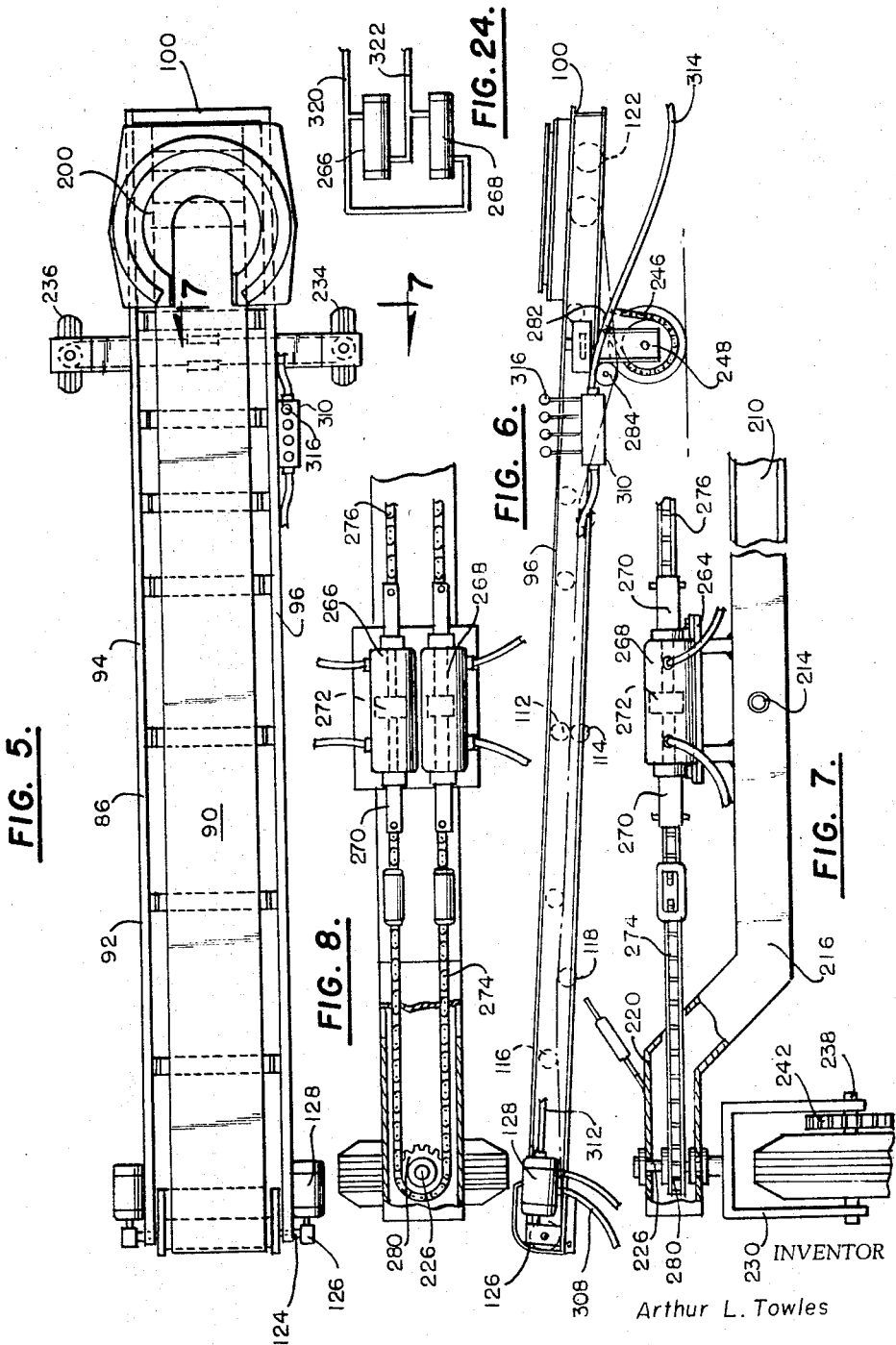

INVENTOR.
Arthur L. Towles
BY John L. Shortley
ATTORNEY

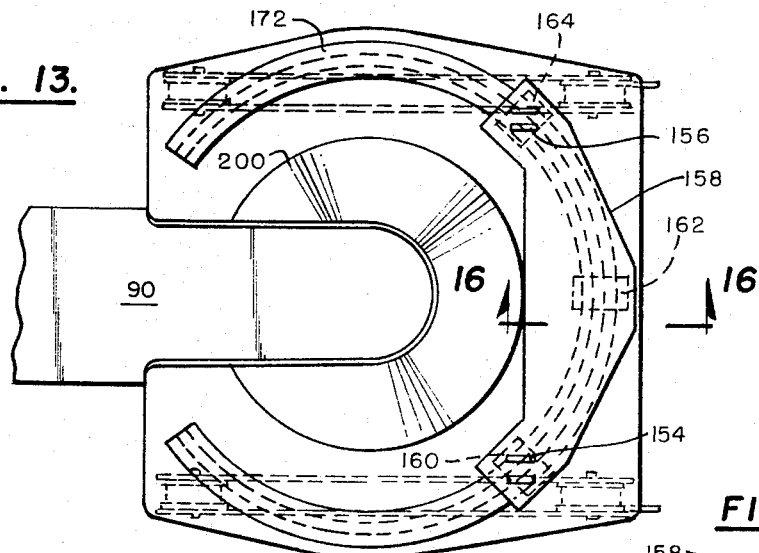
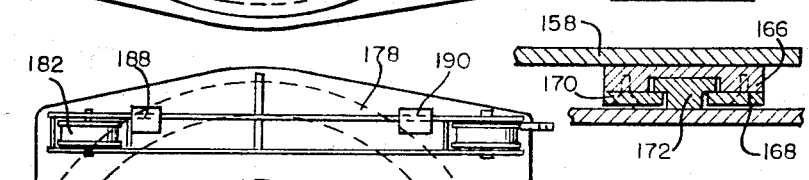
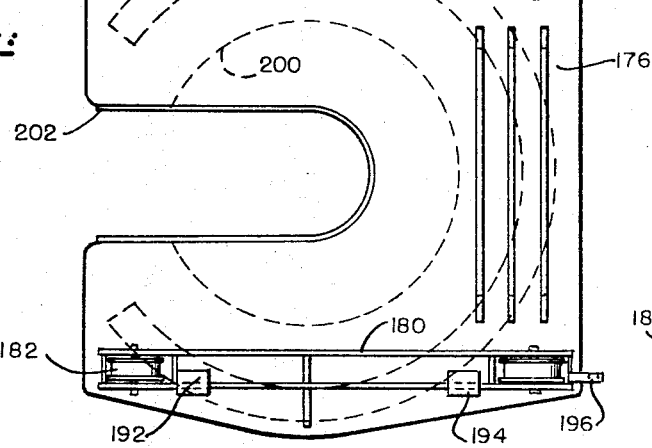
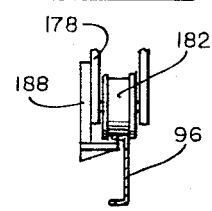
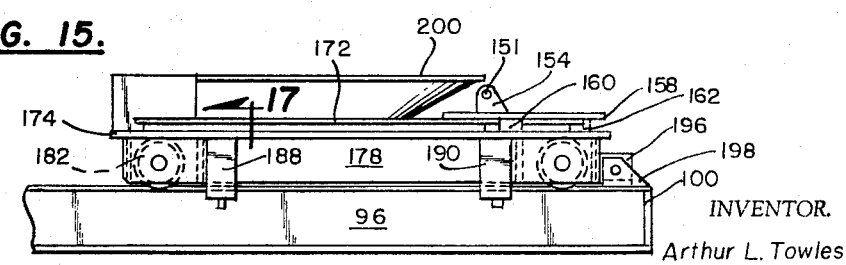

Oct. 18, 1966           A. L. TOWLES           3,279,584
ARTICULATED CASCADE CONVEYOR SYSTEM AND APPARATUS
Filed Jan. 20, 1964               8 Sheets-Sheet 7
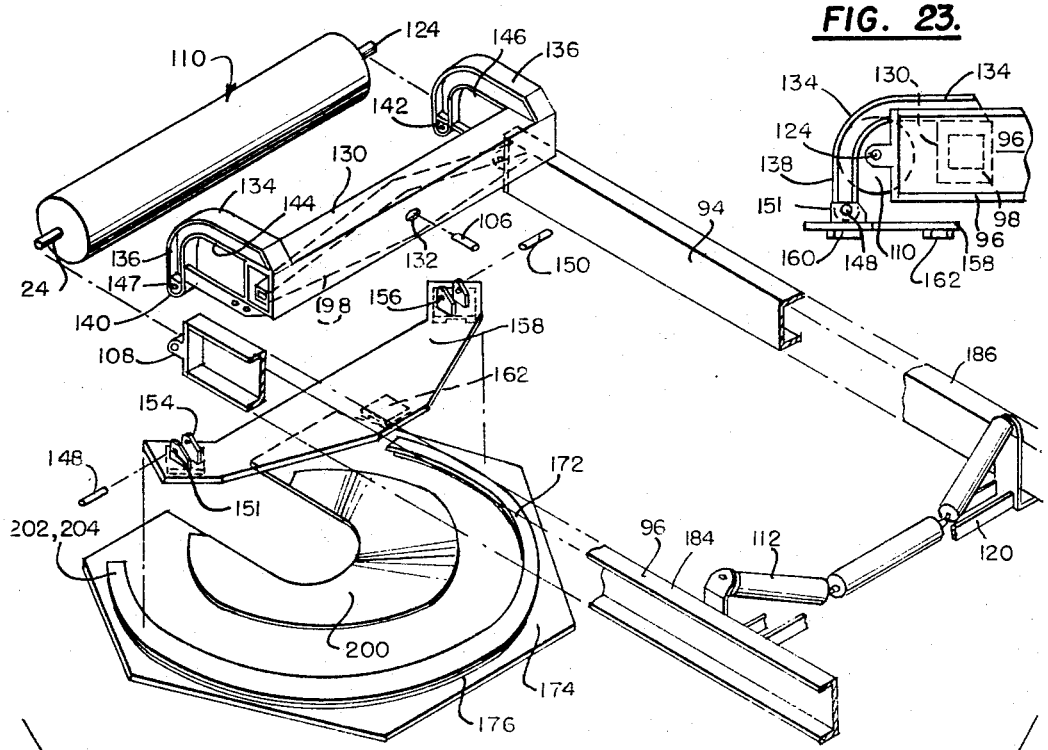
FIG. 23.
FIG. 20.
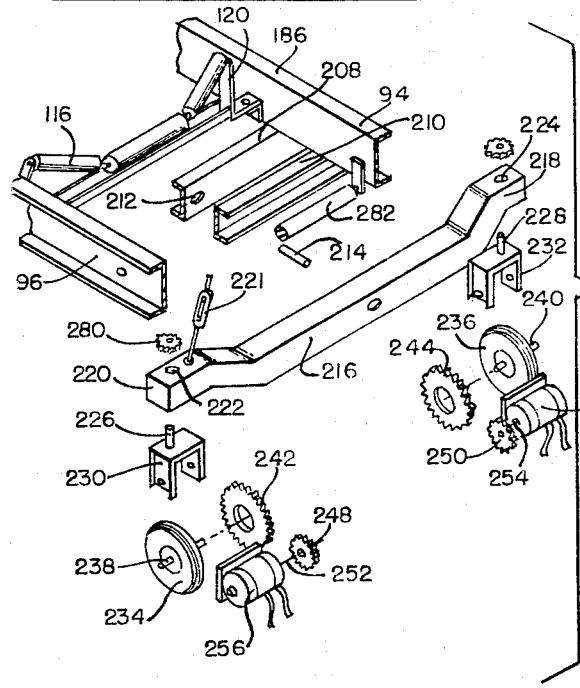
FIG. 18.
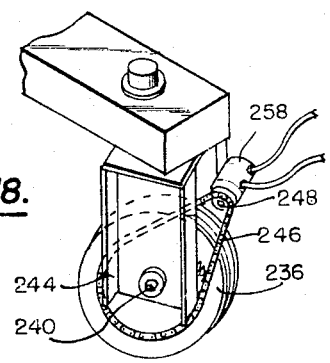
FIG. 19.
INVENTOR.
Arthur L. Towles
BY John L. Shortley
ATTORNEY Oct. 18, 1966

A. L. TOWLES 3,279,584

ARTICULATED CASCADE CONVEYOR SYSTEM AND APPARATUS

Filed Jan. 20, 1964

INVENTOR

Arthur L. Towles

BY John L. Shortley

ATTORNEY

United States Patent Office 3,279,584
Patented Oct. 18, 1966

3,279,584
ARTICULATED CASCADE CONVEYOR SYSTEM
AND APPARATUS
Arthur Leon Towles, 700 Hadfield St., Marion, Ill.
Filed Jan. 20, 1964, Ser. No. 338,866
10 Claims. (Cl. 198—89)

This invention relates to bulk material conveying systems comprising mining or gathering machines and associated continuous conveying devices as well as a means for interconnecting the conveying device and the gathering or mining machine. More particularly this invention relates to combinations of bridging devices, mining or gathering machines and relatively fixed conveyors, as well as to a bridging device itself. According to the invention, continuous material transfer connection from a gathering machine to a fixed conveyor is achieved, yet the gathering machine is completely free to move and adjust relative its source of material. Therefore the gathering machine, such as a mining machine, can adjust relative a mine face it may be cutting or a pile of material it may be picking up with complete freedom, although it is actually continuously in association with the material transferring device. The connection between the gathering machine and the conveyor is referred to herein as a bridge device or a bridge. The bridging means does not hamper the movement and normal operation of the gathering or cutting machine such as a miner. The latter, instead, can operate with the freedom that heretofore it had experienced.

Systems of mining employing bridging devices, as well as various bridging devices or conveyors useful for such systems have been heretofore proposed. However, these proposals have not proved satisfactory to date. There has not been produced, prior to this invention, a truly commercially acceptable bridging arrangement or system and/or bridging units therefore for continuously connecting miners or similar machines with relatively fixed belt conveyors in such a manner that the miner may continuously operate and yet retain its flexibility. There particularly has not been devised bridge-like devices satisfactory for use while the miner or other gathering or cutting machine is in actual process of working on the material to be mined or gathered. Machines such as miners and loaders must continually adjust relative this material; such as relative the face of the mine. The miner, for example, must also move from one cut to anothter. It does not remain still. Furthermore, the bridging devices which have been previously proposed are often of such a cumbersome nature that they are very difficult to put in operation in a mine, as well as difficult to move. Nor has there been provided a bridge system having units which are self-propelled, individually adjustable relative each other unit, and also adjustable both relative a gathering machine such as miner and a relatively fixed conveyor used with the gathering machine. Nor has there been provided such a movable machine for placing in a mine entry with a miner. There has likewise not been provided units which can telescope to shorten the overall length of the bridge provided thereby, and yet which can also extend into a relatively long length while continuously maintaing material-transferring relationship with each other and a miner or the like. Furthermore such an arrangement of telescopic and extensible units also capable of lateral adjustment relative a fixed conveyor or each other has not been provided heretofore. Another factor which has deterred use of the heretofore suggested bridging-type devices is their inability to readily adjust, not only along the length of a relatively fixed conveyor, but also laterally thereof, either while they are moving along the length of the fixed conveyor or while in one position with respect to the length of the fixed conveyor.

Yet another drawback of some previously known arrangements of bridges is the need for fixed guide structure such as cables to maintain the relationship of units. With such arrangement laterally moving units are not feasible and "hanging up," i.e., interference between the units and means such as the cables attached to the grooves is possible.

Among the heretofore proposed units for interconnecting miners with conveyors or other devices there are mechanisms comprising chutes, chain conveyors and individual belt units. Some have fixed sections or units, and some have units interconnected for common pivotal action so as to produce a sinuous effect. Furthermore, there have been provided relatively fixed bridges comprising a sliding or rolling member on a track-way which might be adaptable for bridging between a miner relatively closely spaced with respect to a relatively fixed conveyor. These proposals have drawbacks which have mitigated the likelihood of their being commercially successful. Some of the difficulties experienced with the previously suggested units are:

(1) They are either too cumbersome or too large.
(2) They do not have the maneuverability nor the flexibility needed.
(3) They are too complex and costly and subject to easy disarrangement and break-down.
(4) They have capacity limitations.
(5) They must be attached to a fixed structure, such as the mine floor and their units cannot be individually adjusted relative each other.

According to the instant invention, however, there is provided a system of mining, including a miner and mobile bridging devices which can be moved or adjusted at any time, whenever necessary, but will constantly remain in material transfer relationship with the miner and fixed conveyor. Complete flexibility of adjustment of the miner relative the conveyor, and of the bridging units relative each other and relative the miner and conveyor is possible. Horizontal and vertical, as well as telescopic and pivotal adjustments of the bridge devices relative the miner or similar machine and relative the fixed conveyor and relative each other are possible. There is further provided such a device wherein the bridging system, as well as the mining machine, can be adjusted laterally and longitudinally of the relatively fixed conveyor usually employed in mining. Furthermore, intermediate units of this system can be adjusted laterally and longitudinally with respect to each other.

Another object of the invention is to provide a bridging system consisting of individual cascadingly related conveyor units wherein the units can telescope one upon the other and pivot about horizontal and vertical axes and otherwise have a true universal adjustability with respect to each other, both as to relative directions in which they extend and as to the total length of the bridging provided by the associated units.

Yet a further object is to provide a bridging-conveying arrangement which can be adjusted laterally with respect to the fixed belt conveyor, at the same time or independently of its movement over the latter conveyor.

Still another object of the invention is to provide means interconnecting bridging conveyor units which will insure proper material transfer, yet wherein the units may have maximum relative movement and may telescope relative each other.

Another object of the invention is to provide bridge conveyor interconnections having maximum flexibility yet which occupy a minimum amount of space; which are not unduly high nor wide and yet wherein complete and entirely satisfactory material transfer relationship between the bridges is maintained.

It is also an object of the invention to provide a means for interconnecting two bridging units for relative adjustability about vertical axes wherein there is complete flexibility between units and wherein units can telescope one over another and nonetheless occupy a minimum amount of space.

Still other objects of the invention are to provide a series of units which is completely mobile; a bridging means wherein the units can be adjusted under their own power relative each other, and wherein the units are supported with the minimum number of ground engaging wheels.

A further object is to provide a system in which one unit is supported in part by its next adjacent unit. The latter feature reduces the number of ground engaging wheels and also assists in assuring maximum flexibility.

One prime object of the invention is to provide a bridging system and units which will provide commercially acceptable bridging between a mining machine and a fixed conveyor whereby the mining machine can, in fact, continuously operate. Thus one object is to provide a bridging connection which is continually maintained during the advancing and retreating of the machine.

Another advantage will be apparent from consideration of the fact that in the heretofore proposed devices that embody means for movement over a relatively fixed conveyor the bridging conveyor support and thus the bridging conveyor cannot be readily adjusted as a unit laterally of the conveyor. According to the instant invention, however, it is possible to so adjust the bridging system and any unit of it relative the conveyor.

Further, according to the invention no rigid fixed rail type of connection is needed between the relatively fixed conveyor and the bridging device. Also, according to the instant invention the bridging device can be easily driven out of association with the fixed conveyor to facilitate adjustment, extension, retraction or other operations of the fixed conveyor.

By fixed conveyor it will be understood that there is meant any conveyor which is normally relatively fixed during mining operations, yet at the same time it may be extensible in increments. Such extension might be made through means of a belt storage section and/or by the addition of rigid idler supporting sections. In place of rigid sections there may be employed stands and rope.

Yet another object is to provide a bridge comprising a series of units which can be arranged to be effective conveyors and bridging devices for their whole length. They do not project beyond the length of the bridging material paths they each provide.

Still a further object is to provide bridging units which can be connected in material transferring association to each other and to other material handling units and while in such relationship can rotate relative the associated apparatus through 90° angles without difficulty.

In many mining operations shuttle cars or similar devices are used to transport the material from the face to such a fixed conveyor as described above. These transfer devices each require an operator, provide only intermittent transfer, operate empty at least half the time, and are involved in many accidents. An additional object of the invention is to provide a method of mining whereby these mobile transfer devices are not needed. It is yet another object to provide a mining arrangement which will function in a manner superior to the prior systems employing shuttle cars.

Among the other objects of this invention is that of providing a series of interconnected cascading mobile conveying units which can be levelled with respect to the terrain. Still another advantage is to provide a system which can be independently moved without being connected to a mining or similar machine. In addition an object is to provide an apparatus wherein the maximum total length of individual units may be taken advantage of and yet transfer of material from one to the other is easily achieved.

These and other objects and advantages will become apparent from the following description and the accompanying drawings wherein:

FIGURE 3 is a top plan view of a bridge conveyor in association with a mining machine and a fixed conveyor.

FIGURE 4 is a side elevational view of the structure illustrated in FIGURE 2.

FIGURE 5 is a top plan view of a bridge conveyor device.

FIGURE 6 is a side elevational view of the device illustrated in FIGURE 4.

FIGURE 7 is a fragmentary enlarged view partly in section, taken generally along line 7—7 of FIGURE 5.

FIGURE 8 is a top view of the apparatus of FIGURE 6 with some elements broken away.

FIGURE 13 is a top plan view of a transfer carriage.

FIGURE 14 is a bottom plan view of a transfer carriage of FIGURE 13.

FIGURE 15 is a side elevation view of the carriage of FIGURES 13 and 14 but showing also a portion of the bridge frame in association therewith.

FIGURE 16 is a section taken along lines 16—16 of FIGURE 13.

FIGURE 17 is a section taken along lines 17—17 of FIGURE 15.

FIGURE 18 is an exploded fragmentary perspective view of a bridge unit showing the ground engaging wheels and associated structure forming part of the support for the unit.

FIGURE 19 is a fragmentary perspective view showing a wheel and associated driving means connected to a cross beam member forming part of the wheel support for a bridge unit.

FIGURE 20 is a fragmentary exploded perspective view showing a pivot hitch assembly at one end of a bridge unit and the associated structure at an adjacent end of the next adjacent bridge unit.

FIGURE 23 is a side elevation showing some of the elements of FIGURES 20 and 21 in assembled relationship.

FIGURE 24 is a fragmentary schematic view of an hydraulic system.

Figure 25:
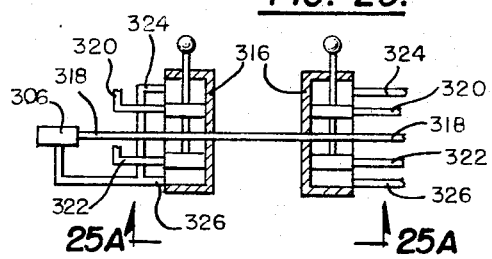

FIGURE 25 and section 25A are fragmentary schematic views of a hydraulic system.

FIGURE 26, a, b, c and e, are schematic plan views of the invention showing various relationships of the elements thereof.

Figure 26A:
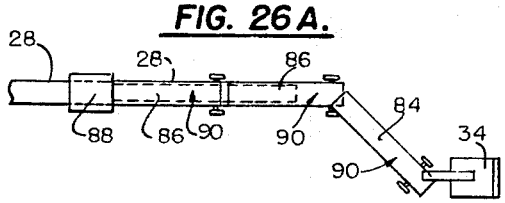
Figure 26B:
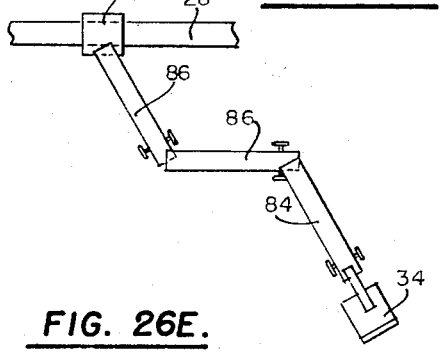
Figure 26C:
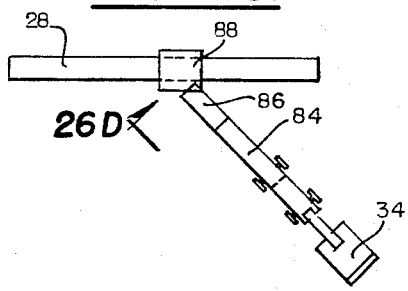
Figure 26E:
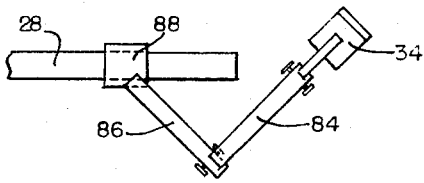
Figure 26D:
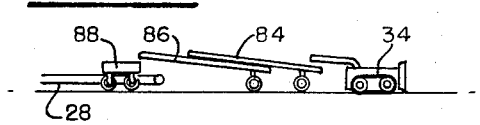

FIGURE 26D is a side elevational view taken along line 26D—26D of FIGURE 26C.

Figure 1:
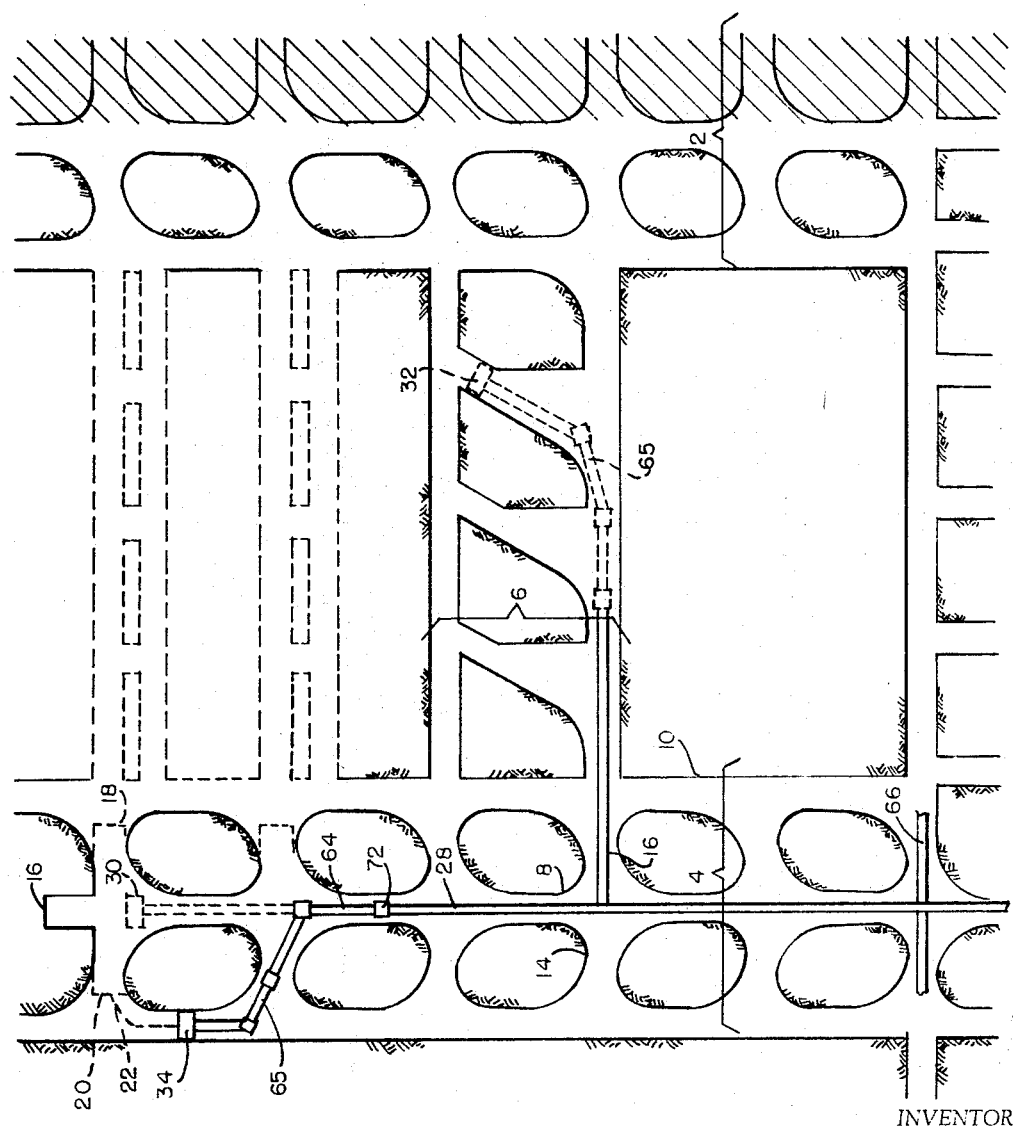
FIGURE 1 is a schematic plan view of a mine.
Figure 2:
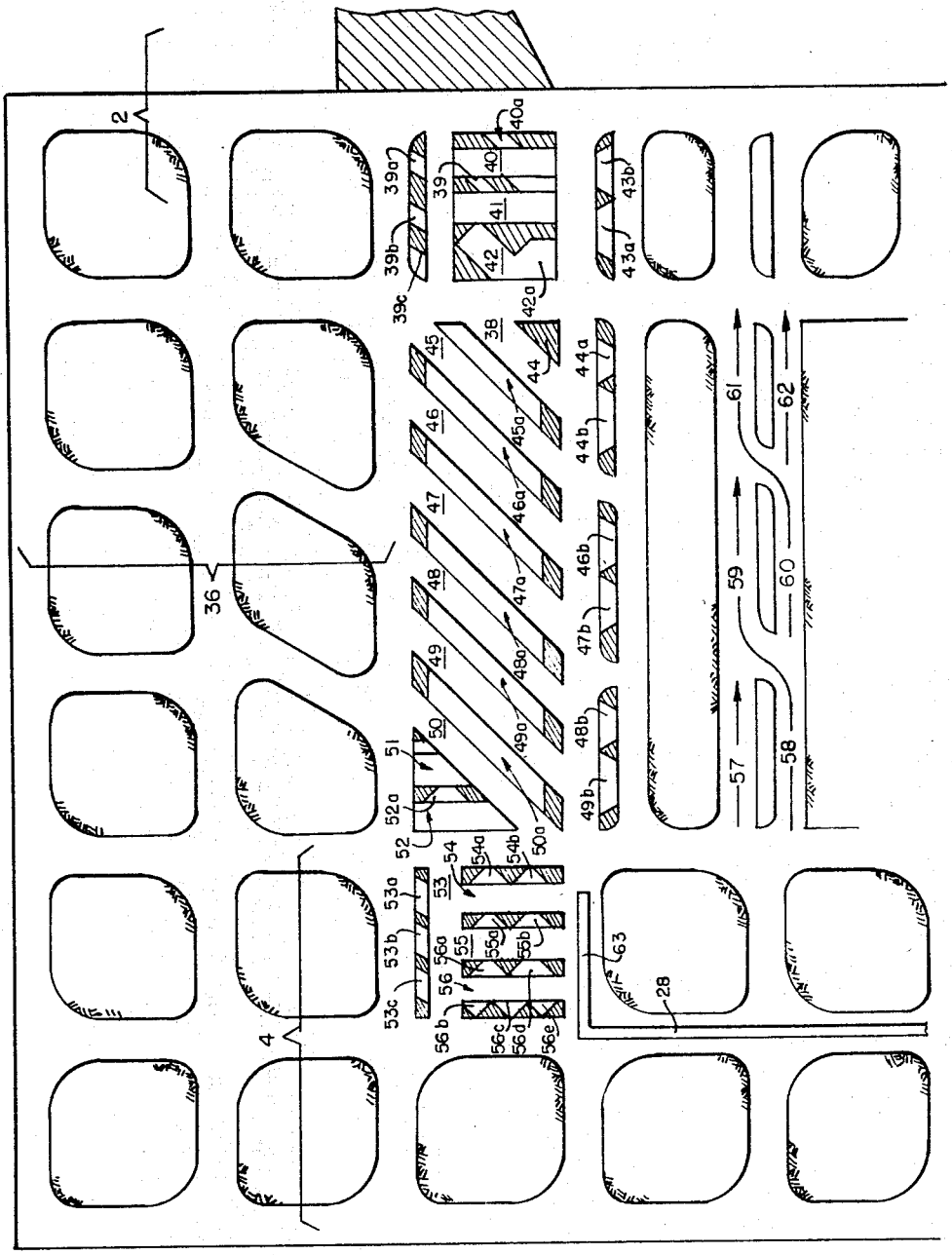
FIGURE 2 is a another schematic view of the mine of FIGURE 1 showing a different stage in the development of the mine.
Figure 2:
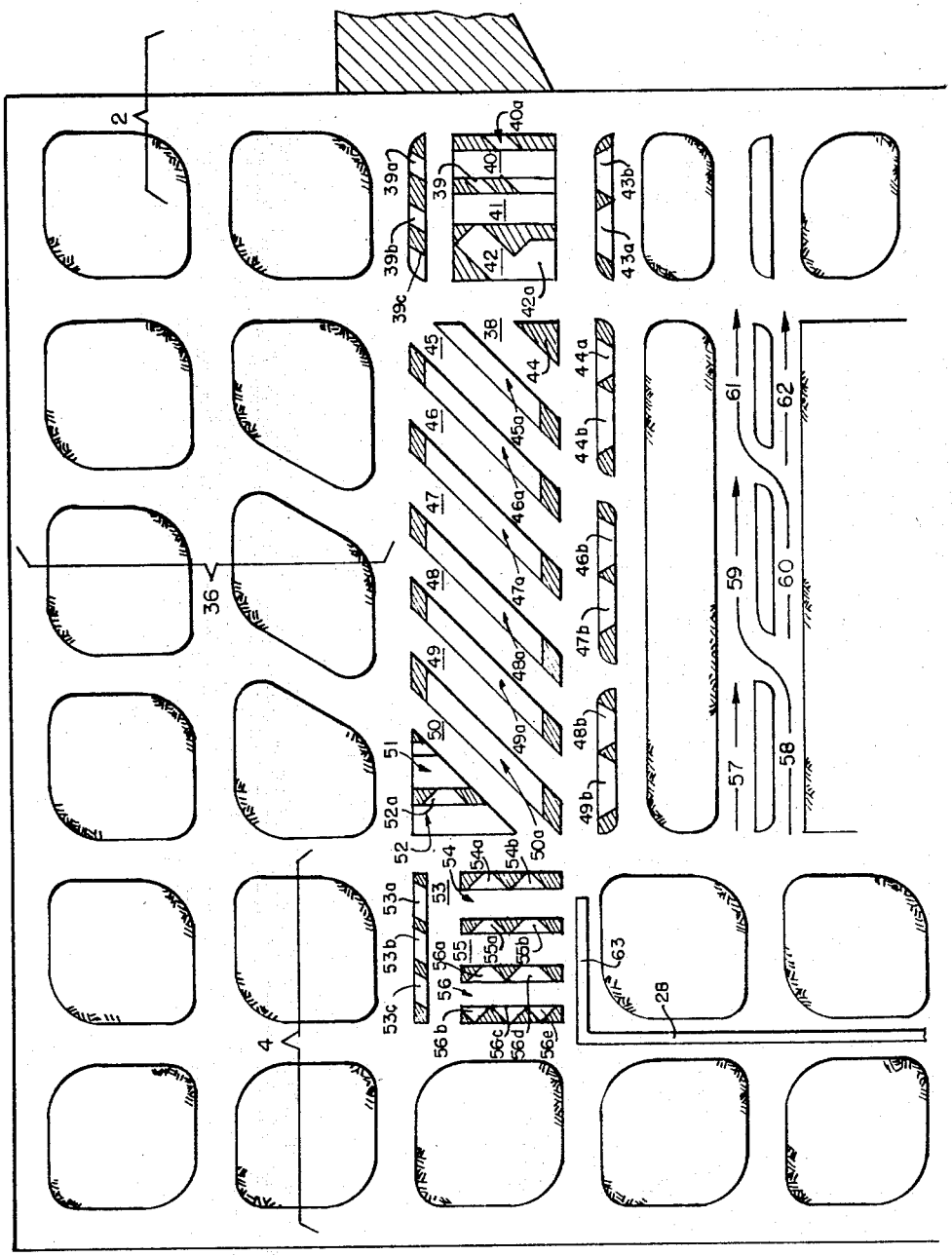

The instant invention is adaptable for use in mining coal, phosphate, and many other minerals, both underground and in open pits. It will be apparent from perusing specification that it also has other uses. For purposes of illustration, the use of the invention in a mining operation has been selected. FIGURES 1 and 2 accordingly illustrate a mining method in which the instant invention will play a major part.

FIGURE 1 shows a mine section partly developed and FIGURE 2 shows the same section during the start of the retreat therefrom. According to FIGURE 1 the panel entries 2 and 4 and rooms 6 are driven off the main entry. These entries are made into the area from which the coal is to be removed. The basic scheme is to drive down to the remotest part of the section and then take the coal out by systematically removing it as the mining operation retreats toward the main entry. Actually, at least two cuts or entries parallel each other must be used as entries and these must be cross connected. As shown in FIGURE 1 three parallel entries 8, 10 and 12, are provided in each entry. These are cross connected at intervals by openings 14 and 16. These cross cuts provide for passage of air to and from the "working face," i.e., the place where the cutting out of the coal is occurring at any particular time.

In the upper left-hand corner of FIGURE 1 there is illustrated a method of starting into an area and producing these entries. The first cut in this instance is taken up the middle; that is, up the entry 8. This first cut may be extended a distance of about 72 feet, for example. After this middle cut is taken for the desired distance—say to the point indicated by the reference numeral 16, the machine is backed slightly and turned to the right. Then a cut approximately to the dotted line position 18 is made. Next the machine is backed up again, turned to the left with respect to the entry 8, and a cut taken to the dotted line position 20. Now the machine is backed down the center the approximately 72 feet of the initial cut, swung to the left, and driven up the direction indicated by the dotted line 22, and turned to connect to the cut 20. Next the machine is brought back through the cut indicated by the line 22 until it has reached the center entry 8. Then it is swung again to the right and driven up to meet the point 18. The machine can be maneuvered to increase the opening sizes as indicated. By this method the openings which cross-connect the entries are provided. Mining regulations usually dictate the extent to which the mining machine can be driven forwardly without having a cross connecting air entry means.

It will be noted that to the right of FIGURE 1 a very similar set of openings and entries have already been made.

The coal blocks illustrated in the entries are termed pillars. These are needed to support the mine roof. These will be removed in retreating.

In driving the entries belt conveyors such as 28 are erected as the mining machine advances. Very often shuttle cars are used to carry the coal from the miner to these conveyors. This, however, necessitates intermittent operation of the miner and constant shifting of the cars. The cars, furthermore, are very dangerous and many men are injured in their operation. As previously stated, according to the instant invention, shuttle cars are unnecessary, and also the miner can operate continuously while it is advancing into the coal.

Referring again to the map, 30 shows the miner making one cut in its advance in an entry, another position is shown at 32, and yet a third at 34. In all instances it is necessary to move the material from the miner to the conveyors.

FIGURE 2 shows the end of the entries 2 and 4. These entries are referred to as room, or butt, or panel entries. The final cross entry 36 is also shown. The entries 2 and 4 may be 2000 feet long, for example. FIGURE 2 also illustrates the manner in which the miner may be operated in retreating to take out the coal from the rooms between the entries, as well as how each room is formed. According to the instant mining plan the cuts are taken in the sequence indicated by the numerals 38 through 62. The shaded areas indicate coal that is not taken out. All the rest is removed.

The final cuts 57 through 62 define the next room to be taken out. It will be noticed that the cross entry 36 will be left and that one side of the entry 4 will be removed. What is, in fact, the remaining side of such an entry is removed as indicated to the right of FIGURE 2 when the next series of rooms are being taken out. The shaded portions remaining are provided to support the roof while the miner is in the area. Since substantially all the coal, however, is removed, the roof collapses as the miner is retreating. The small pillars that remain are only sufficient to temporarily stabilize the roof. As indicated in the extreme right of FIGURE 2, the entire area of the mine will eventually collapse as it is mined out.

As stated above, in the prior known methods of mining coal will be taken from the miner to the conveyors 28 by shuttle cars. In some localities loading machines are sometimes used to load the shuttle cars. The conveyors 63 and 28 are extended and retracted as the mining proceeds to facilitate transfer of coal to them from the miner. However, as is apparent, a mining machine makes many turns and twists relative these conveyors and moves a very substantial distance away from them. As indicated above, heretofore shuttle cars would often be used to carry the coal from the miners to the conveyors.

It is apparent, however, that a continuous mining effort requires a continuous transfer between the miner and conveyors. The means for doing this must be flexible in its operation or otherwise it could reduce the mobility of the mining machine. According to the instant invention there is provided a continuous bridge device, or system, in association with the miner and the fixed conveyor.

The bridge is readily movable with the miner and will not impede movement of the miner. Yet the bridge maintains material transfer association with the miner and the conveyor at all times. This connection is maintained while the miner is moving relative the fixed conveyor as well as while the miner is stationary with respect to the latter conveyor. In dotted lines in FIGURES 1 the bridge conveyor device, constructed according to the invention, is shown schematically in association with the fixed conveyor and the miner illustrated therein. The miner 34, according to the invention, delivers to the bridge 65 (FIGURE 1) which in turn delivers, for example, to the conveyor 28. The latter, in turn, delivers the coal to another conveyor 66. The bridge is designed, as indicated above, and as hereinafter set out so that it will move with the miner and yet maintain connection to the conveyor 28. Again referring to FIGURE 1, the bridge system or device 65 remains in association with the miner and a conveyor, whether the miner is advancing into an opening such as 16 or retreating therefrom to move into opening 22 and then into 24. The bridge device, in fact, remains constantly in material transferring relation with the conveyor and the miner—ready for instantaneous transferring of coal from the miner to the conveyor whenever the miner is operating.

Referring now to FIGURES 3, et seq. wherein the bridging device 68, the relatively fixed conveyor 28, and a miner 34 are illustrated in more concrete form.

The bridging device actually comprises a series of cascadingly associated bridges 84, 86 and a dolly 88 cascadingly associated with the outby bridge 86. Additional bridges can be used to provide a complete bridge arrangement. Thus three, four or more bridges 86 can be used. It should be noted before proceeding further that the structure at the inby end of the outby bridge 86 differs from the structure at the inby end of the inby bridge 84. The structure at the outby ends of the two bridges is, however, identical. Any bridge used intermediate these bridges 86 and 84 will preferably be identical in construction, to the bridge 86. The bridge 84's inby end basically differs from the bridge 86 inby end that the inby end of the bridge 84 has skirt boards 85, 85 which function in the usual manner to prevent spillage of the material received from the gathering machine 22. On the other hand, the inby end of the intermediate bridge 86 comprises a means adapted to be placed in material transfer connection with the outby end of the next adjacent inby bridge. The connection is in such a manner as to effect not only the material transfer between the two bridges, but to also provide telescoping and relatively pivotal movements between these connected bridges while maintaining material transfer between them.

The bridging devices 84, 86 each comprise a belt conveyor 90 (see FIGURES 2, 5 and 6) and a frame 92 which supports the belt conveyor. The frame 92, of both the inby and outby bridges, as well as any intermediate bridge comprises side rails 94 and 96 and end frame members 98 and 100 (see FIGURES 5, 6, 18, 20, 21, 22, 23, 15, and 17).

FIGURES 13 to 17 and 20 to 21 illustrate the structure which serves to interconnect the two bridges 84 and 86. The end frame member 98 of the inby end of the bridge 84 comprises a box-like member extending between the two side-frame members inwardly of their ends. This box-like member has a central opening 104. This opening is adapted to receive a pivot pin 106. The purpose of this pin is to pivotally connect the member 98 and thus, the two frame members 94, 96 and, in fact, the whole bridge frame 92 to another member by means of the pin 106. The pin 106 can be fixed within the opening 104 and pivoted in the other member referred to or vice versa. The side members 94 and 96 extend outwardly of the member 98 (with respect to the length of the conveyor) and at their ends support bearing blocks 108, 108. These support the head pulley 110 of the bridge conveyor. Spaced troughing and return idlers such as 112, 114, 116 and 118 are provided along the length of the bridge. The idlers shown are of the type wherein the troughing rolls and return idler are supported on a single frame 120 which is welded or bolted to the side frame members 94. The frames of the troughing and return idlers serve as part of the frame of the bridge due to their interconnection with the members 94, 96. On the other hand, it will be understood that many forms of intermediate idlers can be used. For example, the idlers may simply be supported on frame hangers suspended from or otherwise connected to the frame members 94, 96. The frame structures might obviously be provided with other stiffeners.

The inby ends of the bridges support the tail pulleys 122.

The head pully has a shaft extension 124. The latter is connected to the reduction gear 126 and motor 128 supported on the side of the frame (see FIGURES 5 and 6).

It will be obvious to those skilled in the art that the motors 128 can be operated to drive the belt conveyors 90 and move material from the inby to the outby end of the bridges.

The frame member 98 is adapted to be received within a hitch box 130. This box-like element 130 has a central opening 132 adapted to receive the pin 106 to thus pivotally interconnect the two members 98 and 130 for pivotal movement about the axis of the pin 106. The box-like member 130 is of a length adapted to extend between the two members 94 and 96 in a manner such that it will be free to pivot on the pin 106. The internal dimensions of the member 98 are also calculated to permit these relative pivotal movements. Movement of approximately 15° is permitted.

The hitch box 130 is provided with forwardly projecting arms 134, and 136. These are formed of sheet or plate and angles and are connected so as to provide downwardly extending forward legs 138. The lower end of these legs are provided with a pivot pin receiving boss 140 and 142 respectively. The bosses 140 and 142 have aligned pin receiving openings.

The legs 134 and 136 define aligned openings 144 and 146 through which the axles 124 of the pulley 110 extend. The pulley 110 thus rotates between the two leg members 134 and 136 and the latter are positioned between the frame members 94 and 96.

The two depending bosses 140 and 142 are provided with openings 147 adapted to receive respectively the pins 148, 150. These pins are also adapted to be received in spaced aligned openings 151 in opposed pairs of plates 154 and 156. Each pair of plates receives one of the bosses 140 and 142 and is pivotally connected thereto by the pins 148 and 150 respectively. The plates 154 are mounted on a swivel plate member 158, (FIGURES 13 through 15, as well as FIGURES 20 through 22). The swivel plate members are provided on their lower surfaces with depending shoes 160, 162 and 164 (see FIGURES 13, 16 and 22). The shoes are formed in part by blocks 166. Blocks 166 cooperate with plates 168 and 170 to form tee slots adapted to receive the track members 172. The plates 168, 170 are held in place by suitable fastening means. Preferably screws are provided to facilitate removal and replacement of the plates, if necessary. The tracks 172 are T-shaped members. One such track 172 is mounted on the carriage 174. Another such track 172 is mounted on plates 176 of the dolly 88. FIGURES 20 through 23 show the construction used to interconnect two bridges. The outer end of the bridge 86 has the same construction up to the point so far described. Thus there is a track 172 mounted on plates 176 of carriage 174 and a track 172 mounted on plate 176 of dolly 86. The plate 176 of carriage 174 forms part of the carriage 174 whereas the plate 176 of dolly 88 forms a structural part of the latter. However, the carriage 174 moves over the bridge which supports it, whereas the plate 176 of the dolly is fixed on the dolly. The construction of the carriage 174 will now be described and the dolly will be described later.

Referring now to the carriage member 174 (see FIGURES 13–17): It is provided with paired depending plates 178 and 180. These support rollers 182 by means of suitable shafts and bearings. Rollers are preferably provided on each side of the movable carriage 174. The rollers are adapted to roll along the upper flanges 184 and 186 of the side frame members 94 and 96 (see particularly FIGURE 17). Spaced angle members 188, 190, 192 and 194 form rail guiding means preventing the unwanted separation between the carriage 174 and the bridge on which it is movably supported. The carriage is provided with a plate 196 adapted to be connected by a bolt to a similar plate 198 on the bridge frame. This can be used to fix the position of the carriage on the bridge frame. Centrally of the tracks 172 a chute 200 is welded to plate 176. This chute is adapted to receive the material from the head pulley 110. The plate 176 and the carriage 174 are slotted as indicated at 202. The chute extends into the slot. The slot provides unhindered movement of the material deposited onto the conveyor through the chute. Stops 204 on tracks 172 prevent runoff of the shoes.

Upon a consideration of FIGURES 20 and 13 through 17, as well as FIGURES 9 through 11, and FIGURES 3 and 4, it will be apparent that the bridge members can pivot about horizontal and vertical axes with respect to each other and with respect to the conveyor 20, as well as with respect to miner 34. The bridges can also rock slightly relative to each other about longitudinal axes extending along the length of the bridges. The latter movement is permitted by the pins 106. Movement about a vertical axis (in a plane) is permitted by the tracks and shoes 160, 162 and 164, and 172. Pivotal movement about an axis extending laterally of the length of the bridges (in a vertical plane) is permitted by the pins 148, 150 and the bosses 140, 142. The track 172 and associated structure permit pivoting about a vertical axis extending through the center of the chutes 200; whereas the pins 148 and 150 permit pivoting about a horizontal axis at right angles thereto. Preferably the latter horizontal axes containing the pins 148, 150 extends centrally through the opening provided by the chute. The pivot pins 106 provide for slight unevenness in adjacent bridges relative each other along axes extending along the length of the bridges. Should the wheels, which support the bridges, and are hereinafter described, be on uneven ground strain would be imposed on the connecting members if the bridges were rigid with respect to each other about axes extending along their length.

The means for achieving the relative pivotal movement of adjacent bridges over the tracks 172 and the movement of the carriages, such as 174 along associated bridges will now be described together with the supporting means for each of the bridges. In this regard, before proceeding further, however, it should be again noted (see FIGURES 3 and 4) that the outby end of the outby bridge is supported on the dolly. The outby ends of the inby bridge (the one closest to the mine face being worked) and the outby end of any intermediate bridges are supported on the next most outby bridge. Thus the outby end of bridge 84 is supported on the inby end of the bridge 86. It should also be noted that one of the advantages of the instant construction is that the bridges can telescope; that is the carriage 174, which supports the bridge 84 on the bridge 86, can be moved substantially to the outby end of the bridge 86. This is illustrated in FIGURES 26C and 26D.

Referring now to FIGURES 3 through 7 and 18 and 19: The outby bridge 86 is provided adjacent its inby end with a pair of channel members 208 and 210 (FIGURE 18). These members are secured to the bottoms of the frame members 94 and 96, with their webs facing each other. They are provided with aligned central, horizontal openings 212 adapted to receive a pivot pin 214. A cross beam 216 is received between the channel members 208 and 210 and pivotally connected to them by means of the pin 214. The cross beam is spaced beneath the two members 94 and 96 sufficiently to permit pivoting movement of the beam about the axis of the pin 214. In the preferred form shown this permitted pivoting movement amounts to 15°. The cross beam in the illustrated form has upward extensions 218 and 220. Turn buckle 221 connects the cross beam—axle—216 to the frame. The pivotal adjustment of the cross beam relative the frame of the bridge is thus controlled. The cross beams are preferably of a box-like construction and adjacent their ends are provided with pairs of vertically aligned openings 222 and 224. Each pair of openings receives a shaft, 226 and 228 respectively. Each of the shafts is secured to fork-like wheel casters or mounts 230 and 232.

The shafts 226 and 228 are suitably journaled within the openings in the box-like cross-beam so that they can pivot freely. Driving wheels 234 and 236 have their shafts 238 and 240 suitably journaled in the aligned openings provided in the members 230 and 232. Each of the shafts 238 and 240 has secured thereto a drive gear, 242 and 244 respectively. These in turn are connected by chains 246 to gears 248 and 250. The latter gears are secured, respectively, to the shafts 252 and 254 of the motors 256 and 258. Each motor is provided with the usual base or platform and by this means is mounted on the members 230 and 232. The platforms are connected to the respective wheel supporting frames 230 and 232.

The motors 256 and 258 in the illustrated form of the invention are hydraulic motors.

Centrally of the cross beam there is provided a platform 264 which supports a pair of double-acting hydraulic cylinders 266 and 268 (see FIGURES 7 and 8). These each have oppositely extending shafts such as 270 which are connected to a piston such as 272. Each of the shafts is also connected to one end of a chain. Thus the two shaft extensions 270, to the left, as viewed in FIGURES 7 and 8, are connected to one link chain 274 and the opposite pair of shaft extensions are connected to a similar link chain 276. Each link chain cooperates with a sprocket 280 connected to one of the shafts 226. The hydraulic motors 266 and 268 are interconnected so as to rotate the two sprockets 280 to effect the desired steering. It will be noticed that the sprockets 280 are received within the cross-beam end members 218 and 220. FIGURE 24 shows schematically the hydraulic interconnection between the motors 266 and 268.

Pulleys 282 and 284 are used to guide the return run of the belt conveyor beneath the cross beam. While the construction for the bridge 86 has been described it will be understood that the inby bridge 68 has the same construction.

Referring now to FIGURES 9 through 12, the dolly 88 is provided with four self-propelled, steerable wheels. These are supported on the dolly by means of cross-beam structure similar to that previously described. Thus at the inby end the dolly has a cross-beam member 286. The latter, however, is not pivotally connected to the dolly but instead forms a part of the rigid framework of the dolly. This cross-beam member is also box-like in construction and supports pairs of hydraulic cylinders (motors) 288. The chains 290 cooperate with sprockets 292 connected to shafts 294. Each shaft 294 is in turn connected to the wheel supports 296 which support the wheels 298. Sprockets and chains and motors, generally indicated at 300, which are of the same type as previously described, are carried by the wheel support. It will be apparent that the structure is the same as that illustrated in FIGURES 5 through 7 and that the wheels can be rotated and driven by hydraulic motors.

Figure 9:
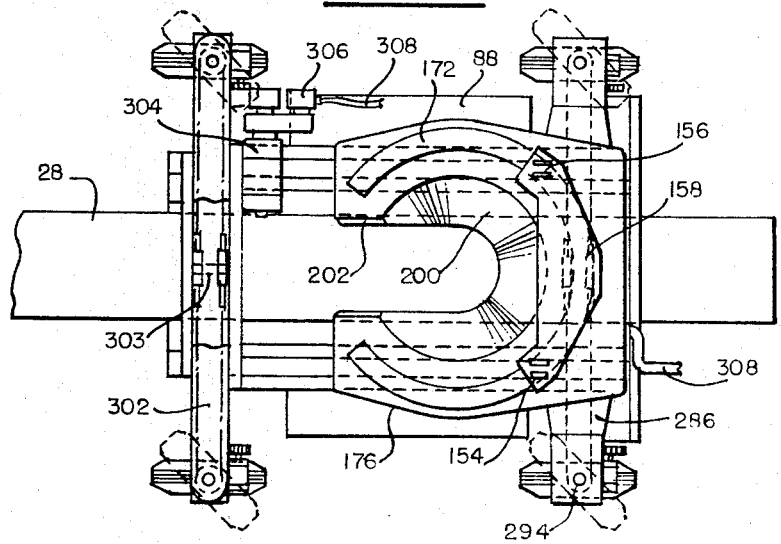
FIGURE 9 is a top plan view of a dolly transfer device forming part of a bridging system with some elements deleted or broken away to improve the representation.
Figure 10:
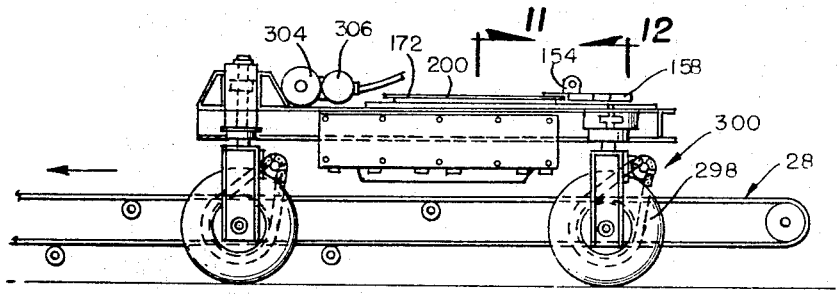
FIGURE 10 is a side elevational view of the latter.
Figure 11:
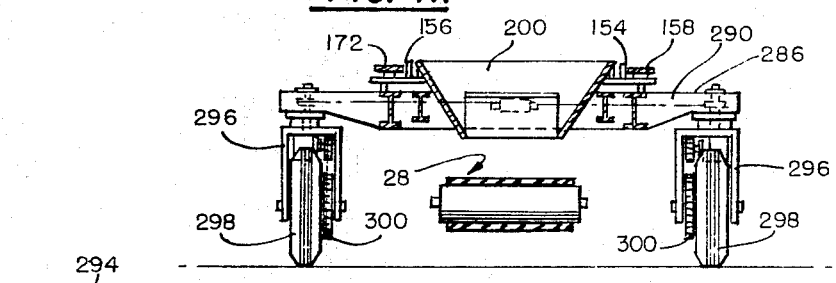
FIGURE 11 is a sectional elevational view taken along line 11—11 of FIGURE 10.
Figure 12:
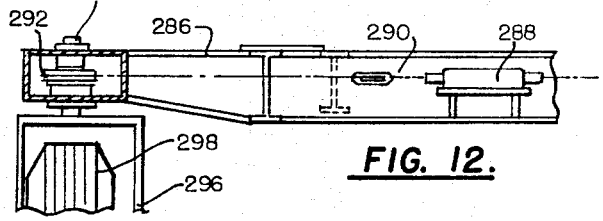
FIGURE 12 is a fragmentary section taken along line 12—12 of FIGURE 10.
Figure 21:
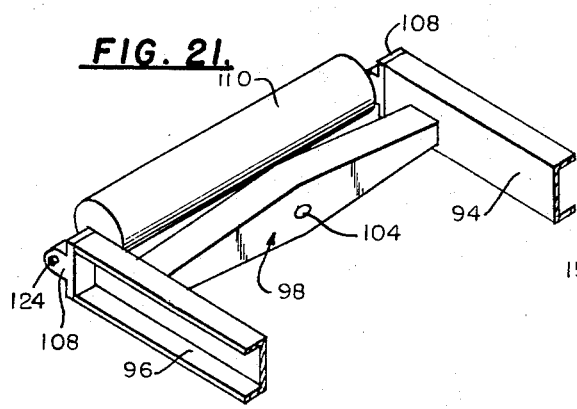
FIGURE 21 is a fragmentary perspective of a portion of the structure appearing in dotted lines in FIGURE 20, together with some associated elements.
Figure 22:
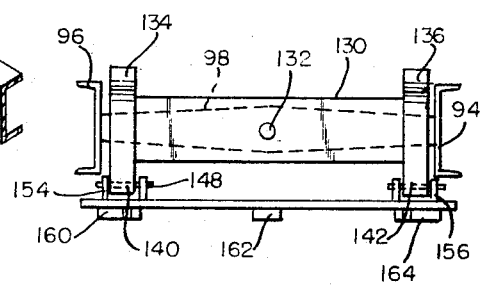
FIGURE 22 is an end elevation showing some of the elements of FIGURES 20 and 21 in assembled relationship.

The construction at the left of the dolly, as viewed in FIGURES 9 and 10, is substantially the same as that to the right of the dolly. However, in the left-hand end of the dolly the cross-beam like construction 302 is extended across the top of the dolly and is pivotally connected to the dolly by pin 303. This structure; i.e., the pivot pin-axle construction is the same as illustrated in FIGURES 7 and 18. Positioning of the axle 302 above the dolly provides clearance for the material dumped onto the belt 20. The dotted line position of the wheels, in FIGURE 9 illustrates that they can be rotated to effect lateral movements of the dolly with respect to the belt 28.

The provision of four self-propelled and completely steerable wheels on the dolly is an important feature in that it considerably facilitates the movement of the dolly. The dolly and the bridges connected thereto are designed so that they can move along the length of the conveyor 28 in adjusting with the movements of the miner. Further, because of the fact that the wheels can be turned on the dolly the whole bridge assembly can be adjusted laterally of the conveyor 28. This considerably facilitates moving the bridge system along the conveyor, as it makes it possible to readily accommodate for slight unevenness in the ground, lack of alignment between conveyor stands, and other impediments. The dolly, it should be noticed, is provided with an electric motor 304 and a pump 306. From this there are extended fluid lines 308 to a control center 310. This control center is provided with suitable valves from which there is extended suitable hydraulic lines such as 312 and 314 leading to the various hydraulic motors, including the conveyor drive motors 128, the steering motors 266 and 268 and the wheel driving motors 256 and 258. Preferably rigid conduit is used along the lengths of the bridges with hydraulic hose extending between the pivot connections. The hydraulic hose 314 between the bridges is of a length to permit telescoping of the bridge 84 over the bridge 86 as will be hereinafter described, whereas, the hose 308 leading from the pump to the bridges need only be long enough to permit pivotal movement. The outby end of the bridge 86 which is supported on the dolly 88 pivots but does not telescope over the dolly.

Before proceeding to describe a particular telescoping movement reference is made to FIGURE 3 wherein in dotted lines there is illustrated how the bridge members may assume different attitudes with respect to each other and with respect to the dolly. It again will be understood that the dolly will be in varied positions along the length of the conveyor 28 and in any of these positions movement such as indicated by the dotted lines may be achieved. These movements are achieved by manipulating the control valves at the control center 310.

Figure 25A:
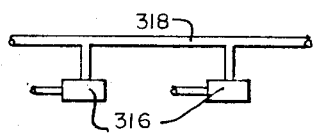

FIGURES 24, 25, and 25A show schematically a hydraulic circuit employed. As therein illustrated, the pump 306 supplies each of the control valves 316 from a pressure main 318. Pairs of takeoff lines such as 320 and 322 extend from the valves to each hydraulic conveyor motor 128 and also to each drive motor, such as 256. Lines 324 and 326 lead back to the pump and form the returns. It is apparent that by manipulation of the control handles the valve spindles can be moved to connect pressure alternately to either of the lines 320 and 322 while the other line, not so connected, will form a return line from the motor. As previously pointed out, FIGURE 24 illustrates the steering motors are connected in pairs so that they will each assist the other in rotation of the shafts 226 and 228. It will be apparent that all of the motors are double-acting. The drive wheels thus can be driven both forward and reverse, and the steering can also be power-driven in either direction. Furthermore, the conveyors can be reversed if necessary, to free an obstruction, for example. It will be understood that each of the valves can be identical according to this system. Obviously it will occur to those skilled in the hydraulic art that other arrangements of valves can be used and multiple controls can be employed for simultaneously activating all power driven wheels or movement of the conveyor system in a single direction, etc. In the illustrated embodiment separate pumps and controls are provided for the steering system and the tramming system.

FIGURES 26a through e disclose the bridging system in various relationships with respect to the miner and conveyor and with respect to the individual bridge units. Further, FIGURES 26c and 26d show the bridge conveyors in a telescopic relationship with respect to each other. FIGURES 26a and b show a bridge system involving three bridge elements 84, 86 and 86, in which the intermediate member 86 is, as previously set forth, of the same construction as the bridge 86. FIGURES 26c, d and e show a two bridge system.

The telescoping movement illustrated in FIGURE 26d can be achieved by driving the carriage 174 along the side rails of the bridge 86. This driving movement is readily achieved by proper manipulation of the hydraulic controls for the power-driven wheels of the two bridges. For example, if the bridge 86 has its wheels locked in position by neutralizing the hydraulic control therefore and the controls for the wheels of the bridge 68 are actuated so as to drive the wheels in reverse, the latter bridge will move up along the bridge 86. This ability to telescope is usable in instances where the miner has to operate close to the conveyor 28 such as when an entry is being started. It is also useful when the miner is moving laterally of the conveyor 28 but is positioned quite close by.

From the foregoing description it will be apparent that there has been provided a means for continuously connecting a mining machine to a belt conveyor while the mining machine is making its movements within the mine. The connection is maintainable both while the miner is backing up and while it is moving forward. An operator mounted at the control station 310 can control the movement of the bridges, both in their pivoting and telescopic movement and movement over the conveyor 28 so as to continuously maintain a belt conveyor connection between the miner and the conveyor 28. The necessity to provide haulage devices such as shuttle cars between a miner and a belt conveyor has been done away with. The mining process itself can be greatly speeded up and considerably greater usage of a miner can be achieved. Further, there is much less danger of accident such as there is when shuttle cars are in operation. Retreat mining can more safely be engaged in. According to the invention a continuous connection between the miner and the conveyor for continuously transporting material is provided, and yet this connection can adjust continuously or intermittently, with respect to the conveyor and miner. Thus the connection can move freely along the mine conveyor 28 without any particular attachment thereto and can adjust laterally with respect thereto. For example, the bridges may be positioned to one side with the dolly extending over the conveyor and the dolly can run up and down and adjust laterally of the conveyor (see FIGURES 26b, c and e). Or the bridges themselves may subtend the conveyor and move along its length for some distance and be likewise adjustable laterally, together with or independently of the dolly (FIGURE 26a). Individual bridges can telescope with respect to the next adjacent bridge to further facilitate adjustment. The bridges may assume many angles with respect to each other and may adapt themselves readily to variations in the terrain. They can pivot with respect to each other about longitudinally extending axes substantially through their points of connection. One group of the latter axes extend laterally of the bridges, and the other of the group of axes extend longitudinally of the bridges. Since, further, the power-driven wheels of each bridge can be turned independently of the wheels of any other bridge, great flexibility of one bridge with respect to the other is achieved, as well as with respect to the miner and the conveyor 28.

While I have shown and described a preferred form of my invention, it will be understood by those skilled in the art that many changes can be made and, accordingly, I claim exclusive right to all modifications coming within the scope of the appended claims.

I claim:

1. In a material handling system comprising a relatively fixed conveyor and a relatively movable material gathering machine, a conveyor bridging device extending between the latter machine and said relatively fixed conveyor, but being unconnected to either and forming therewith a continuous material conveying path, conveying means on said bridging device having a discharge end in material transfer relationship with said relatively fixed conveyor, said bridging device comprising relatively adjustable conveyor units associated by material transferring means, a dolly straddling said relatively fixed conveyor, said dolly forming said discharge end of said bridging device, wheels supporting said dolly for movement lengthwise along said relatively fixed conveyor, said wheels being steerable for movement of said dolly laterally normal to said conveyor while said dolly is straddling said conveyor, means on said dolly forming a chute overlying said relatively fixed conveyor, means on said dolly anchoring the discharge end of one of said units in material transfer relationship with said chute and for pivotal movement about a vertical axis extending substantially through the center of said chute, whereby the latter mentioned unit can pivot about a vertical axis extending substantially centrally of said relatively fixed conveyor, yet said dolly can move along said conveyor and adjust laterally with respect thereto, said units being cascadingly and telescopingly associated, with each unit being providing with a single pair of steerable supporting wheels substantially adjacent the outermost end thereof with respect to said dolly for telescoping movement of each unit over the unit which lies under its discharge end for a maximum distance, each of said pairs of wheels being independently powered and independently steerable for individual adjustment of each unit with respect to the others, means maintaining continuous material transfer relationship among all said units and said dolly throughout all relative telescoping and pivotal movements of said units, whereby said bridging device can constantly move to follow the movements of said gathering machine through compound movement obtained by pivotal movement of each bridging device relative the others and telescoping of all or some of said bridging devices and movement of said dolly along said relatively fixed conveyor.

2. The combination of claim 1 wherein said units while telescoped and while in longitudinal alignment are movable together with said dolly along and over the end of said relatively fixed conveyor, said relatively fixed conveyor having a tail end.

3. The combination of claim 1 including each of said units being telescopic along a substantial part of the length of a unit adjacent thereto and being pivotal about a vertical axis extending substantially through the center of the conveyor of said unit adjacent thereto.

4. In a bridge conveying device, having a head and a tail end, a conveyor having an upper load carrying run, a lower return run, and a head and a tail pulley, and a frame having side rails, a first frame member connected to said side rails and extending between said upper and lower runs, a second frame member extending between said upper and lower runs said second frame member being connected to said first frame member for pivotal movement about an axis longitudinally parallel to said conveyor, arms connected to said second frame member and extending from said second frame member along each side of said head pulley, a swivel plate member connected to said arms beneath said frame, a support, said swivel plate member being connected to said support to support said bridge conveying device adjacent said head end upon said support, said support having means thereon adapted to receive material from said conveyor, the latter means being in material receiving relationship with said conveyor, the connection between said swivel plate member and said support being such that said bridge conveying device can pivot about a vertical axis positioned outwardly of said head end and longitudinally central with respect to said conveyor, means for supporting said tail end of said device.

5. The bridge conveying device of claim 4 wherein one of said frame members is a box-like member and the other member extends through said box-like member.

6. The bridge conveying device of claim 4 wherein said arms extend between said head pulley and said side rails.

7. The bridge conveying device of claim 4 wherein the axis of pivot of said second frame member relative said first frame member is substantially central of said frame side rails.

8. The bridge conveying device of claim 4 wherein said means for supporting said tail end of said device comprises a pair of wheels each pivotal about a vertical axis extending substantially through the axis of rotation of each of said wheels.

9. The bridge conveying device of claim 4 including a track on said support, shoes connected to said track for sliding movement along said track, said shoes being connected to said plate and supporting said plate on said track for pivotal movement about said vertical axis.

10. The bridge conveying device of claim 9 wherein said support comprises a conveying means, a frame supporting the latter means, supporting wheels connected to said frame adjacent the tail end of the latter conveying means, said track being movable lengthwise along the latter conveyor means and the latter frame.

References Cited by the Examiner
UNITED STATES PATENTS

| | | | |
|---|---|---|---|
| 1,576,910 | 3/1926 | Hudson | 198—233 X |
| 1,932,897 | 10/1933 | Jaggard | 198—95 X |
| 2,642,984 | 6/1953 | Mercier | 198—233 |
| 2,948,552 | 8/1960 | Moon | 198—92 X |
| 2,992,722 | 7/1961 | Moon | 198—89 |
| 3,107,776 | 10/1963 | Long | 198—99 |

EVON C. BLUNK, *Primary Examiner.*

WILLIAM B. LaBORDE, EDWARD A. SROKA,
*Examiners.*